United States Patent [19]

Schleimer et al.

[11] Patent Number: 6,108,655

[45] Date of Patent: Aug. 22, 2000

[54] METHOD AND APPARATUS FOR TRANSMITTING IMAGES AND OTHER OBJECTS OVER A COMPUTER NETWORK SYSTEM

[75] Inventors: Stephen I. Schleimer, San Jose; John K. Ahlstrom, Cupertino; Paul L. Hickman, Los Altos, all of Calif.

[73] Assignee: Cisco Technology, Inc., San Jose, Calif.

[21] Appl. No.: 08/896,408

[22] Filed: Jul. 18, 1997

Related U.S. Application Data

[60] Provisional application No. 60/022,188, Jul. 19, 1996.

[51] Int. Cl.[7] .................................................. G06F 17/30
[52] U.S. Cl. ........................... 707/10; 709/231; 709/303; 395/500.02; 395/710; 707/513; 712/203; 712/213
[58] Field of Search ................ 707/103, 10; 395/200.31, 395/500.02; 712/203, 213; 709/231, 303

[56] References Cited

U.S. PATENT DOCUMENTS

| | | | |
|---|---|---|---|
| 5,321,816 | 6/1994 | Rogan et al. | 395/200 |
| 5,465,377 | 11/1995 | Blaner et al. | 395/800 |
| 5,502,726 | 3/1996 | Fischer et al. | 370/94.1 |
| 5,535,375 | 7/1996 | Eshel et al. | 391/500 |
| 5,594,911 | 1/1997 | Cruz et al. . | |
| 5,623,656 | 4/1997 | Lyons | 707/10 |
| 5,657,390 | 8/1997 | Elgamal et al. | 380/49 |
| 5,687,339 | 11/1997 | Hwang | 395/383 |
| 5,732,234 | 3/1998 | Vassiliadis et al. | 395/376 |
| 5,734,903 | 3/1998 | Saulpaugh et al. | 709/303 |
| 5,745,908 | 4/1998 | Anderson et al. | 707/513 |
| 5,758,085 | 5/1998 | Kouoheris et al. | 709/231 |
| 5,758,114 | 5/1998 | Johnson et al. | 395/380 |
| 5,774,660 | 6/1998 | Brendel et al. | 395/200.31 |
| 5,825,890 | 10/1998 | Elgamal et al. | 380/49 |
| 5,845,084 | 12/1998 | Cordell et al. | 395/200.64 |
| 5,872,920 | 2/1999 | Hausman et al. | 395/200.8 |
| 5,911,066 | 6/1999 | Williams et al. | 395/710 |
| 5,923,736 | 7/1999 | Shachar | 379/93.17 |

*Primary Examiner*—Anton W. Fetting
*Assistant Examiner*—Jean M. Corrielus
*Attorney, Agent, or Firm*—Beyer & Weaver, LLP

[57] ABSTRACT

A network browsing system includes a host computer coupled to a client computer by a network. A network browser process implemented on the client computer is capable of establishing a connection with the host computer and of generating a request for desired data from the host computer which is to generate desired images on the display of the client computer. A server process implemented on the host computer services the request for desired data received from the client computer by modifying the desired data into modified data such that no additional connection between the client computer and the host computer is required to receive the entirety of the modified data. The browser process of the client computer can generate the desired images from the modified data to the same extent that it could from the originally requested desired data.

14 Claims, 10 Drawing Sheets

METHOD AND APPARATUS FOR TRANSMITTING IMAGES AND OTHER OBJECTS OVER A COMPUTER NETWORK SYSTEM

CROSS REFERENCE TO RELATED APPLICATIONS

This application claims the benefit of copending provisional patent application No. 60/022,188, filed Jul. 19, 1996, the disclosure of which is incorporated herein by reference.

TECHNICAL FIELD

This invention relates generally to computer networks, and more particularly to the efficient transmission, storage and display of images and other objects over computer networks.

BACKGROUND ART

The Internet has, of late, become extremely popular. The origins of the Internet date back several decades to a U.S. government sponsored military/research/business wide area network (WAN) that was designed to remain operational even in the event of the catastrophe, e.g. a major earthquake or a nuclear war. To accomplish this goal, robust protocols and systems were developed which allowed a geographically distributed collection of computer systems to be connected as a WAN such that the loss of a particular computer, or group of computers, would not preclude the continued communication among the remaining computers.

While the use of the Internet has been prevalent for many years now, its use has been limited by the arcane and difficult commands required to access the various computers on the network. To address this problem, a protocol known as the "World Wide Web" or "WWW" was developed to provide an easier and more user-friendly interface for the Internet. With the World Wide Web, an entity having a domain name creates a "web page" or "page" which can provide information and, to a limited degree, some interactivity.

A computer user can "browse", i.e. navigate around, the WWW by utilizing a suitable web browser and a network gateway (e.g., an Internet Service Provider (ISP)). For example, UUNET, America Online, and Global Village all provide Internet access. Currently, the most popular web browser, known as the Netscape® Navigator® is made by Netscape Corporation of Mountain View, Calif. The web browser allows a user to specify or search for a web page on the WWW, and then retrieves and displays web pages on the user's computer screen.

The Internet is based upon a transmission protocol known as "Transmission Control Protocol/Internet Protocol" (or "TCP/IP" for short), which sends packets of data between a host machine, e.g. a server computer on the Internet, and a client machine, e.g. a user's personal computer connected to the Internet. The WWW is an Internet interface protocol which is supported by the same TCP/IP transmission protocol. Intranets are private networks based upon Internet standards, and have become quite common for managing information and communications within an organization. Intranets, since they subscribe to Internet standards, can use the same web browser and web server software as used on the Internet.

With a rapid proliferation of the Internet and Intranets, much attention has been given to performance issues. In particular, the issue of "bandwidth", i.e. the rate at which data can be moved within the network system, has been the focus of a considerable amount of research and development. As an example, many users still connect to the Internet through a 28.8 Kbit/second modem. This can make the "downloading" of large amounts of information (e.g., photographs, graphics, video, and audio) painfully slow. There are times when a complex web page, including a number of high resolution images or other objects, can take several minutes to download from the host machine to the client machine.

The prior art addresses bandwidth limitations in Internet and Intranets by, essentially, increasing bandwidth. This can be accomplished through higher speed data transmission and through compression techniques. For example, instead of using standard analog telephone lines, much faster digital ISDN or T1 lines can be used. However, these faster digital telephone lines can be quite expensive. Higher speed modems, such as cable modems, are also under development. In addition, compression techniques can make a standard 28.8 Kbit modem appear to transmit data at twice that speed.

While increasing bandwidth, improving data compression, etc. has been helpful in improving Internet and Intranet performance, other performance-robbing characteristics of Internet/Intranet performance have only been partially addressed. One example is the "latency" problem where TCP/IP packets are routed through a number of routers, and perhaps servers or other devices (collectively referred to herein as "nodes") on their journey between the host machine and the client machine, where each node adds its own delay. Another example is the "connect" problem wherein each connection between host machine and client machine introduces a sometimes considerable delay.

In FIG. 1, a simplified representation of an Internet 10 and a client machine 12 is shown. Client machines are typically personal computers made to the IBM-PC standards and running a Microsoft Windows operating system, Apple Macintosh computer systems, or work stations made by Sun Microsystems, Hewlett Packard Company, and the like. Client machine 12 is coupled to the Internet 10 by a data link 14, such as an analog or digital telephone line (with appropriate modem and/or other interface). The client typically makes its initial connection with an Internet Service Provider (ISP) 16A, which is connected to the Internet 10 with one or more data links 18. The ISP 16A is one form of "node" 16. Nodes on the Internet comprise computers of various sizes and types, although they mostly tend to run some variant of the Unix operating system. There are nodes on the Internet that are personal computers, workstations, minicomputers, and mainframe computers and specialized computers known as routers and switches. A host computer 16B (which is another form of node 16) resides somewhere within the Internet 10, and may be directly coupled to the ISP 16A or may be coupled to ISP 16A via a number of data links 18 and nodes 16. The various nodes are computers that can be used to route TCP/IP packages towards their final destination. Intranets are designed in a similar fashion as the illustrated Internet 10.

A typical web browsing session is as follows, whether on the Internet, on an Intranet, or on a combination of the two. A user of a client machine 12, such as a personal computer, starts a web browser application program. The manufacture and use of computers, such as client machine 12 and host machine 16B are well known to those skilled in the art.

As mentioned previously, the Netscape Navigator web browser is currently the most popular web browser. The browser is used to connect the client machine 12 to the Internet 10 via the ISP 16A. The client machine and the ISP 16A communicate with each other by means of the aforementioned well-known TCP/IP protocol. When the ISP 16A detects a connection request from the client machine 12 in the form of a "Uniform Resource Locator" or URL 20, the connection request is routed by the Internet 10 to the host 16B providing that URL. The host 16B receives the connection request and the URL of the desired page, and transmits the page to the ISP 16A in TCP/IP packets. The ISP then sends a page 22 in Hyper-Text Mark-Up Language (HTML) to the client 12. Most web browser software cache recent pages in an associated hard disk 24 so that if the same URL is requested in the future, the data will be quickly and locally available to the client computer 12.

The connection process to a host machine on the Internet or Intranet can be quite time consuming. For example, a busy Internet site can take several seconds or even minutes to create a connection with a client machine, particularly during peak traffic times. This is due, in part, to the inherent latency of the connection process through the Internet but is more often due to the relative slowness of the host machine to respond to a connection request. This is because the host machine can only respond to a finite number of simultaneous requests for connections from client machines.

To partially address this connection delay problem, most web browsers, as mentioned previously, allow for caching of recently accessed pages on the hard disk 24 of the personal computer. For example, with reference to FIG. 1, the client machine 12 will "cache" the web page 22 on its hard disk 24 so that if a subsequent request is made for the web page 22, it will be immediately and locally available.

The connection and caching process of the prior art will be discussed in greater detail with reference to FIGS. 2, 3a, and 3b. In FIG. 2, a web page 22 is written in HTML code 26, which is a declarative, high-level computer language. A browser parses and interprets the HTML code 26 to generate the desired image on the computer screen or other page effect. The HTML code 26 begins with a "start of file" code 28, namely "<HTML>." The HTML 26 ends with an end of file ("eof") code 30, namely "</HTML>." The body of the HTML code 26 includes a number of HTML commands including the image commands "IMG" 32.

In FIG. 3a, a prior art browser "Acquire URL" process 36 is illustrated. The process 36 can be initiated ("evoked") by, for example, providing the URL to the web browser, by using a web browser "bookmark," etc. Once the Acquire URL process 36 has begun, it is determined whether the requested web page is in the cache of the client machine in a decision step 38. If the web page corresponding to the URL is in the cache, it is fetched in a step 40. Again, the cache is typically stored on a hard disk 24 connected to the client machine 12. Then, a "Process Page" process 42 is evoked, after which the process 36 is completed as indicated at 44. The process 42 will be described in greater detail subsequently.

If the desired page is not in the cache as determined by step 38, a connection to the appropriate host machine is opened in a step 46. This connection goes through the Internet service provider 16a, through an indeterminate number of Internet nodes 16, before connecting with the host 16b. The page corresponding to the URL is then is retrieved byte-by-byte from the host 16b in a step 48. If an eof is detected in a step 49, the connection between the client machine and the host machine 16b is closed in a step 50 and the process is completed at step 44. Otherwise, the page bytes are processed by the process page process 42 as they arrive in step 48. Alternatively, and more simply, the process can be thought of as opening a connection, retrieving a page, processing the page, and closing the connection.

The Process Page process 42 of FIG. 3a is illustrated in greater detail in FIG. 3b. The process 42 retrieves, in a step 54, the next HTML component to be processed. As used herein, an "HTML component" is a piece of HTML code that is parsed and interpreted by the web browser to control the image and other page effects displayed upon the client machine 12, or to provide another web browser control function. Next, in a step 56, if the end of file ("eof") is encountered, the process is completed as indicated at 58. If an eof has not been encountered, it is determined whether there is an embedded URL in the HTML component. If so, the process 36 "Acquire URL" is evoked. If there is not an embedded URL, or after the URL has been acquired by process 36, the HTML component is processed in a step 62. After the completion of the step 62, process control is returned to step 54 to retrieve the next HTML component of the page 22.

In should be noted that the processes 36 and 42 are recursive in that process 36 can call process 42 and process 42 can call process 36. Therefore, there can be several nested layers of URL acquisitions, each of which would require a time-consuming connection between the client machine 12 and the host machine 16b.

In FIG. 4, prior art "server" software running on, for example, host machine 16b is illustrated. In a step 66, the process 64 waits for a connection request and URL from a client machine. Of course, other processes may be running on the host machine while waiting for a connection request and a URL. Once a connection request and a URL have been received by the host machine, a step 68 returns the requested page and the connection is closed in a step 70. Process control is then returned to step 66.

From the foregoing discussion, it will be apparent that the retrieval of a web page can result in multiple connections being made between a client computer 12 and a host 16b. For example, if a web page includes a dozen distinct images, at least a dozen connections to the host computer 16b must be made. If the host 16b is busy, causing a server responsiveness delay, or if there is high network traffic on the Internet 10, causing a latency delay, very poor performance can be experienced by the user of the client machine.

DISCLOSURE OF THE INVENTION

The present invention addresses the multiple connection delay problem that leads to a degradation of system performance. One preferred embodiment of the present invention is completely compatible with standard web browsers, but does not take advantage of a client machine's cache. In another preferred embodiment of the present invention, a modified web browser is provided which enhances performance by utilizing techniques that both reduce connections to a host machine and which effectively use a client machine's cache. In yet another preferred embodiment of the present invention, the host machine provides information to the client machine based upon a knowledge of the contents of the client machine's cache in such a manner that the number of connections is minimized. In a still further preferred embodiment, the host machine and the client machine can exchange information to notify each other of their respective capabilities and features. This exchange of information can be used to make the described processes even more efficient.

As noted previously, the host computer (or "machine") 16b and the client computer (or "machine") 12 are preferably general purpose computers that are available from a number of sources. Client computers 12 typically include monitors or displays to display images that can be viewed by a user of the client computer. Such computer typically include a microprocessor, input/output (I/O) circuitry, and a variety of computer readable medium such as random access memory (RAM), floppy disks, hard disks, CD-ROMs, read only memories, DVD, etc. The construction and use of such computers are well known to those skilled in the art.

A "server" process in accordance with the present invention for running on a host machine begins with the detection of a connection request and a URL from a client machine. The server process then pre-processes the web page designated or "addressed" by the URL, returns the page, and closes the connection. This pre-processing of the page is designed to reduce the number of connections that the client machine must make with the host machine.

In one embodiment of the present invention, the "Server Process Page" process begins with obtaining the desired page and retrieving the next HTML component of the page. If the next HTML component is the end of file ("eof"), a "Processed Page" is returned. If the next HTML component is not a local embedded URL, it is appended to the Processed Page, and the next HTML component to be processed is retrieved. If the HTML component is a local embedded URL, a recursive call is made to the Server Process Page process, after which the resultant is appended to the Processed Page before obtaining the next HTML component. As a result, instead of the host machine sending the client machine an HTML page which would require multiple reconnections between the two machines to resolve, the web page is pre-processed at the host machine to include the data that would have otherwise required those reconnections.

In another embodiment of the present invention, an additional step has been added to the Server Process Page process. More particularly, after recursively evoking the Server Process Page process, a new HTML object is created including the object made by the recursively called Server Process Page process and the original reference (i.e. the original URL). This new HTML object is optimized to work with a modified web browser of the present invention.

A web browser of the present invention can be made utilizing a public-domain web browser program such as the Mosaic web browser created by the National Center for Super Computing (NCSC), which is freely available on the Internet. Alternatively, the present invention can be implemented as a "plug-in" or "extension" of commercial web browser such as the aforementioned Netscape Navigator browser. In either event, the present invention modifies the web browser such that it can respond to a new command known as "cache image" or "CI." In the parser and interpreter for the web browser, a cache image or "CI" command will cache the image of the new HTML object based upon the original reference (URL). In this fashion, embedded images or other large files (such as video or audio files) need to be sent from the host machine to the client machine only once, since subsequent references within the same page can be retrieved from the client machine's cache memory.

In yet another embodiment of the present invention, the server process on the host computer obtains information about the contents of the client machine's cache. If a requested page is already in the cache, that page is not sent again by the server. Otherwise, this embodiment operates in essentially the same manner as embodiments described previously.

In another embodiment of the present invention, once the server process on the host computer creates a processed page, it is locally cached in a server cache on the host computer along with a list of resolved files that replaced the URLs. Each URL entry includes time, date, and size parameters. In this manner, if a subsequent request is made for that page, and if all of the resolved URLs are current as determined by their parameters, the page can be immediately retrieved from the server cache and sent out as the processed page. If the URLs are not current, the page can be deleted from the cache and then re-resolved.

The present invention therefore improves the performance of an Internet session by reducing the number of re-connects required between the client machine and the host machine. Therefore, the performance of the network system is enhanced without increasing bandwidth or reducing latency. One embodiment of the present invention accomplishes this task in a fashion that is 100% compatible with existing web browsers. Another embodiment of the present invention accomplishes this task even more efficiently by providing a modified web browser. A still further embodiment additionally checks the contents of the client machine's cache to minimize the redundant transmission of page data. Yet another embodiment further enhances performance by providing a server cache for resolved pages.

These and other advantages of the present invention will become apparent upon reading the following detailed descriptions and studying the various figures of the drawings.

BEST MODES FOR CARRYING OUT THE INVENTION

Figure 1:
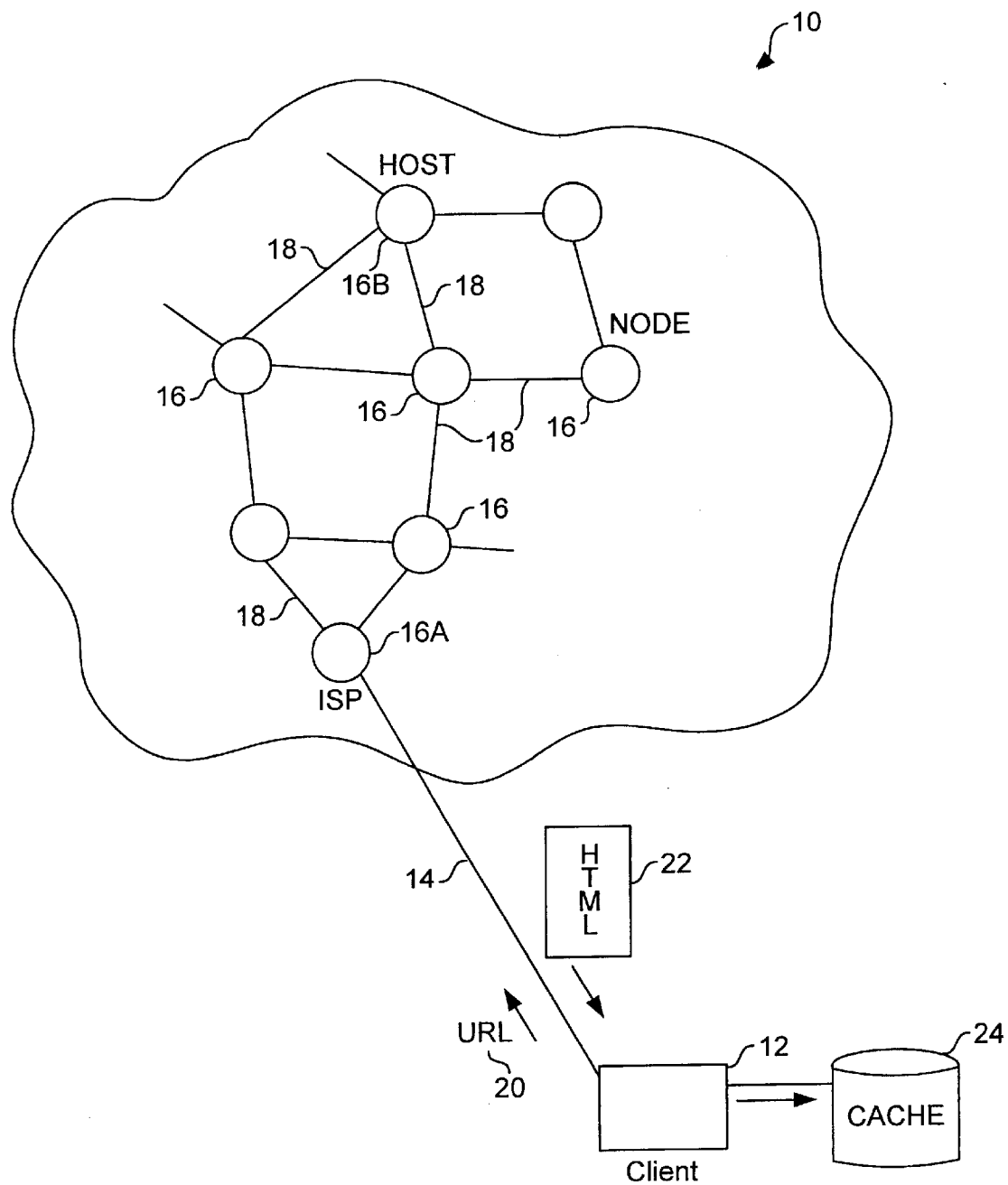
FIG. 1 is a pictorial representation of the Internet and of a client machine connected to the Internet for the purpose of browsing the World Wide Web.
Figure 2:
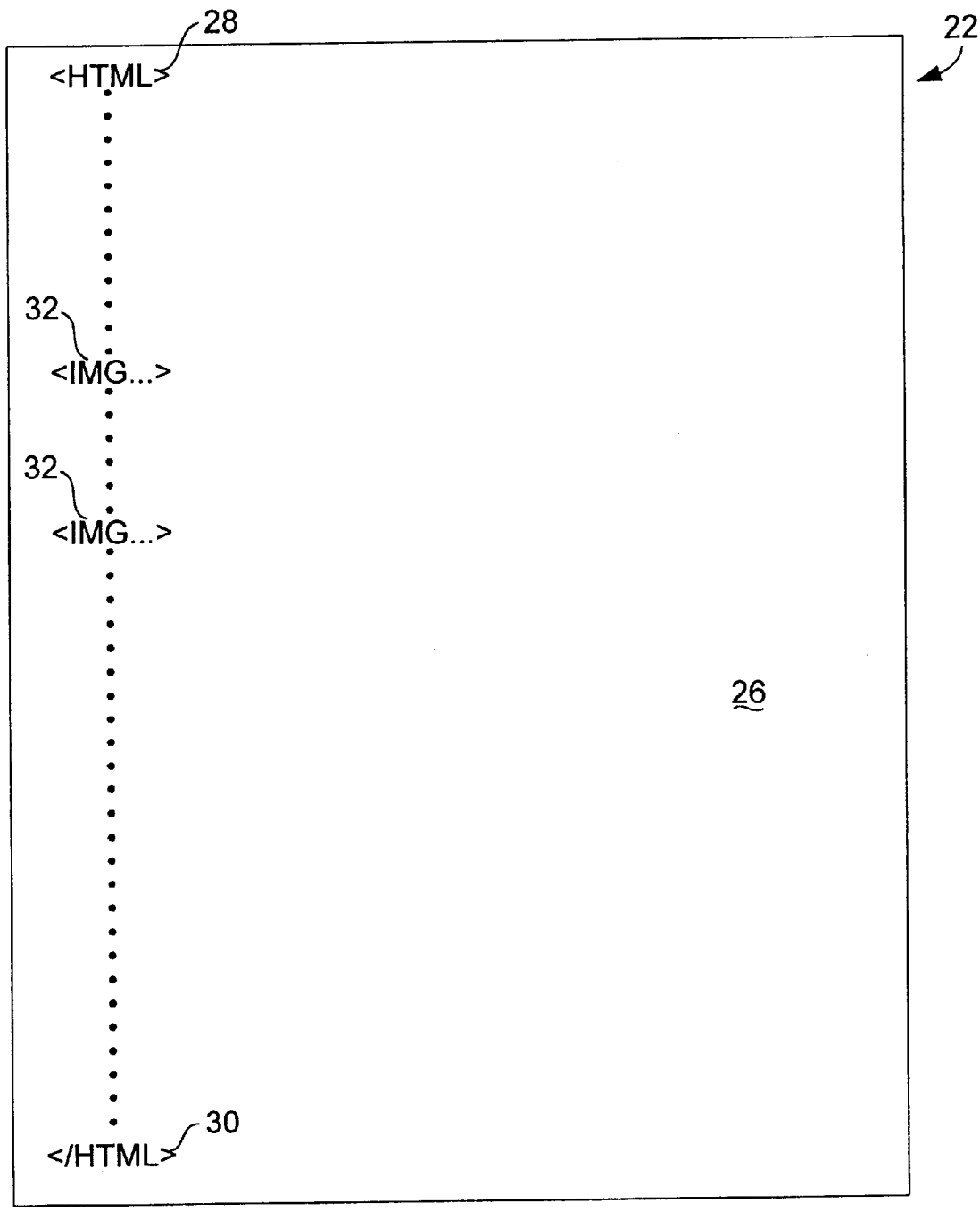
FIG. 2 illustrates a conventional web page of the prior art including a number of HTML commands.
Figure 3A:
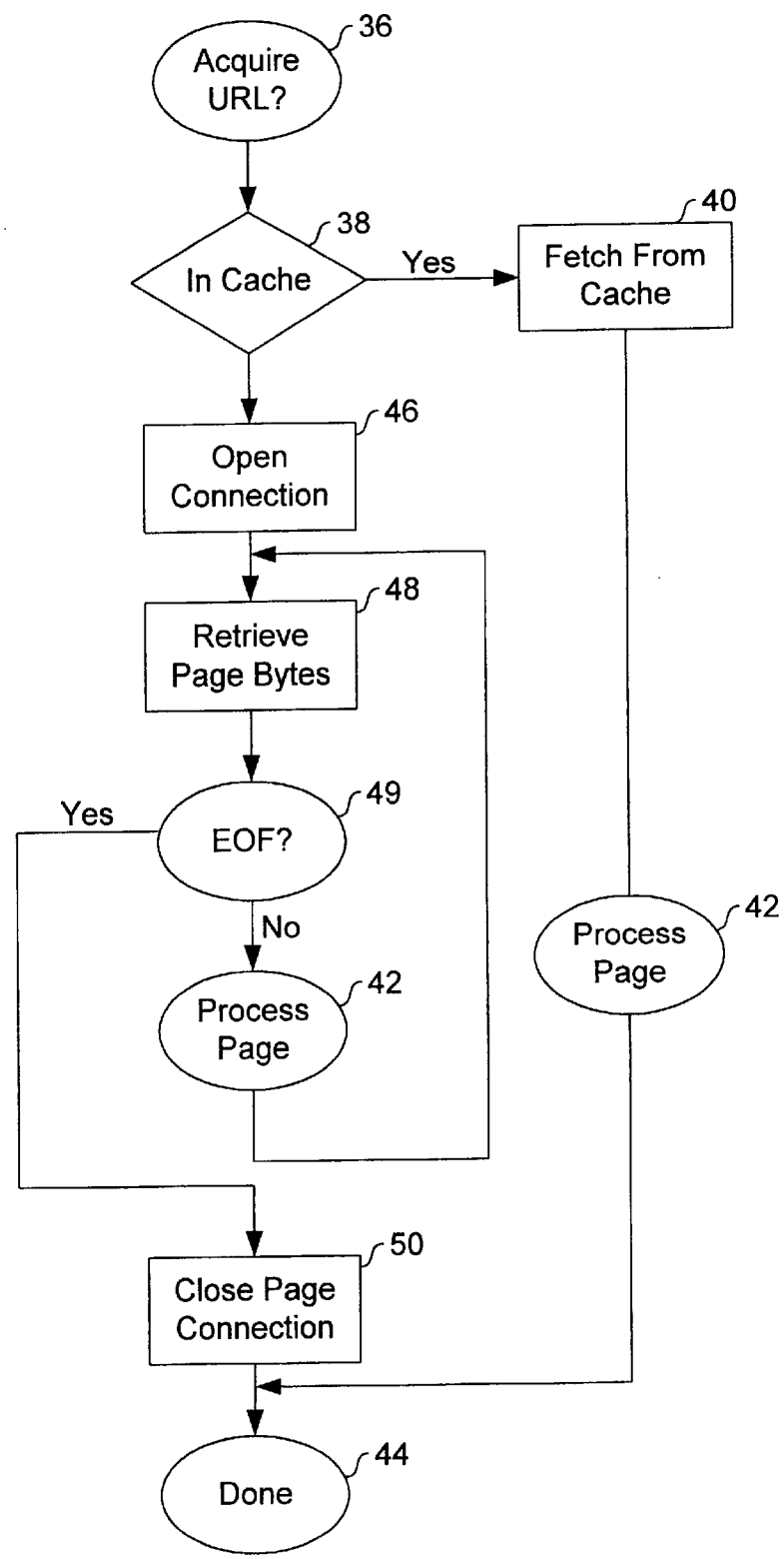
FIGS. 3*a* and 3*b* illustrate a prior art web browser process running on a client machine connected to the Internet.
Figure 3B:
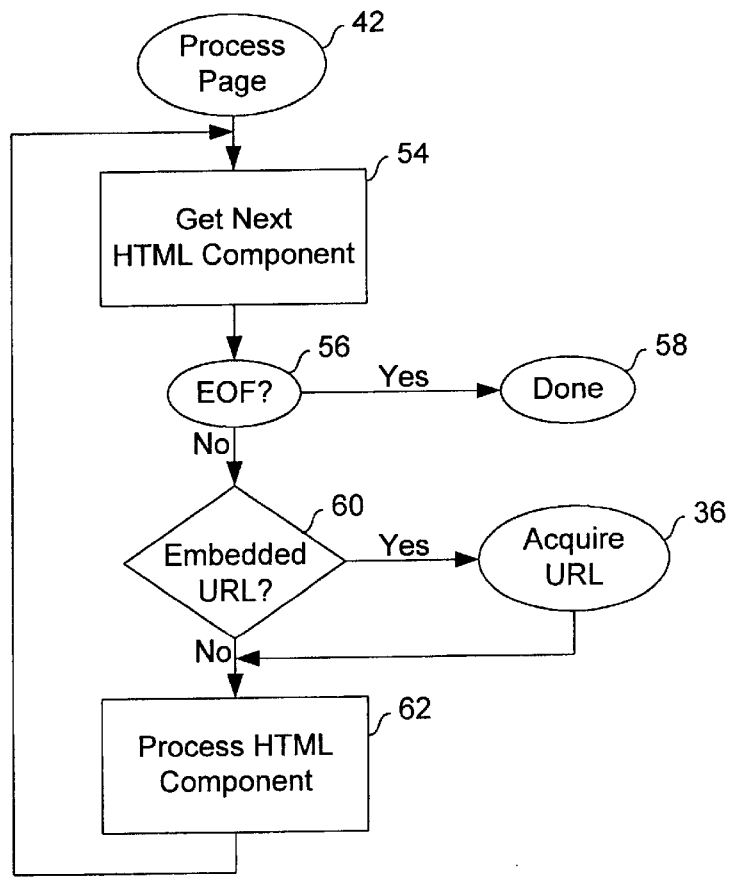
Figure 4:
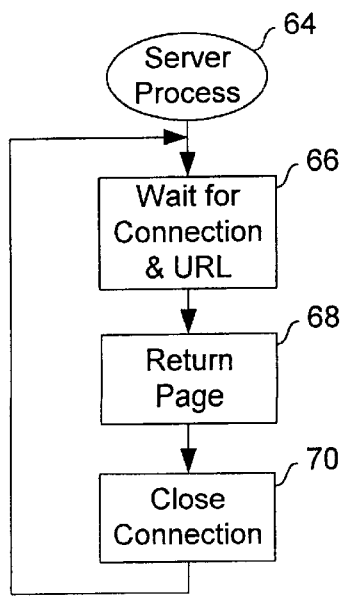
FIG. 4 illustrates a prior art server process running on a host machine connected to the Internet.
Figure 5:
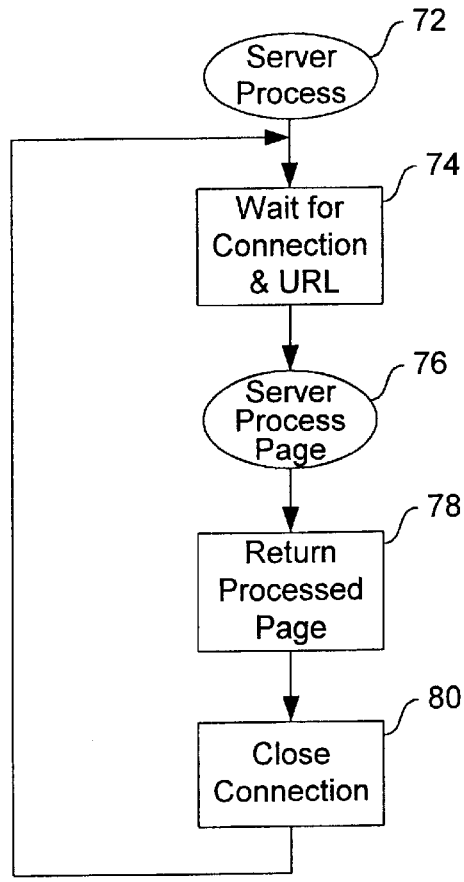
FIG. 5 illustrates a server process for a host machine in accordance with the present invention.

As described previously, FIG. 1 illustrates the Internet 10 connected to a client machine 12. FIGS. 2, 3*a*, 3*b*, and 4 were discussed in terms of the prior art. In FIG. 5, a server process 72 of the present invention running on a host machine 16B waits for a connection and a URL from the client machine 12 in step 74. Other server processes can be performed during this wait step 74. When there is a connection request and a URL from a client machine, a "Server Process Page" process 76 is called or "evoked." Next, a step 78 sends the page to the requesting client machine, and the server process 72 running on the host machine closes the connection with the client machine at step 80. Process control then returns to step 74.

The server process 72 is common to several embodiments of the present invention. One preferred embodiment for the Server Process Page process 76A is illustrated in the flow diagram of FIG. 6a. This embodiment first checks to see if the requested page has been cached on a server cache of the host machine in a step 81. The server cache of the host machine is typically stored on a hard disk drive of the host machine. If the page has not been cached, the process 76A obtains the web page designated by the URL in a step 82. It should be noted that the step 82 succeeds when the requested page is local to the server on that host machine. If step 81 determines that the page is cached, it obtains the cached page from the server cache in a step 83. A step 85 then determines whether all of the resolved URLs of the page are current. This can be accomplished by comparing, for example, time, date and size parameters associated with the URLs. If they are current, the cached page becomes the processed page in a step 87, and then the processed page is returned in a step 88. If all of the resolved URLs are not current as determined by step 85, the page is deleted from the cache in a step 89 and process control is returned to step 82.

The effect of caching resolved pages on the server cache is that subsequent requests for those pages do not require the server to re-resolve those pages. This will reduce the computational burden on the host machine and will boost the performance of the server.

Next, in a step 84, the next HTML component is retrieved from the HTML code listing of the web page. A step 86 determines whether the next HTML component is the end of file ("eof") and, if so, the Processed Page is returned in a step 88. If the next HTML component is not the eof, a decision step 90 determines whether it is a local embedded URL. If not, the next HTML component is appended to the Processed Page and process control is returned to step 84. If the next HTML component is a local embedded URL, the Server Process Page process 76A is recursively called as indicated at 76A' to ultimately resolve all of the URLs of the page. Process control is returned to the Append To Process Page step 92 after the completion of the recursive Server Process Page process 76A'.

Figure 6A:
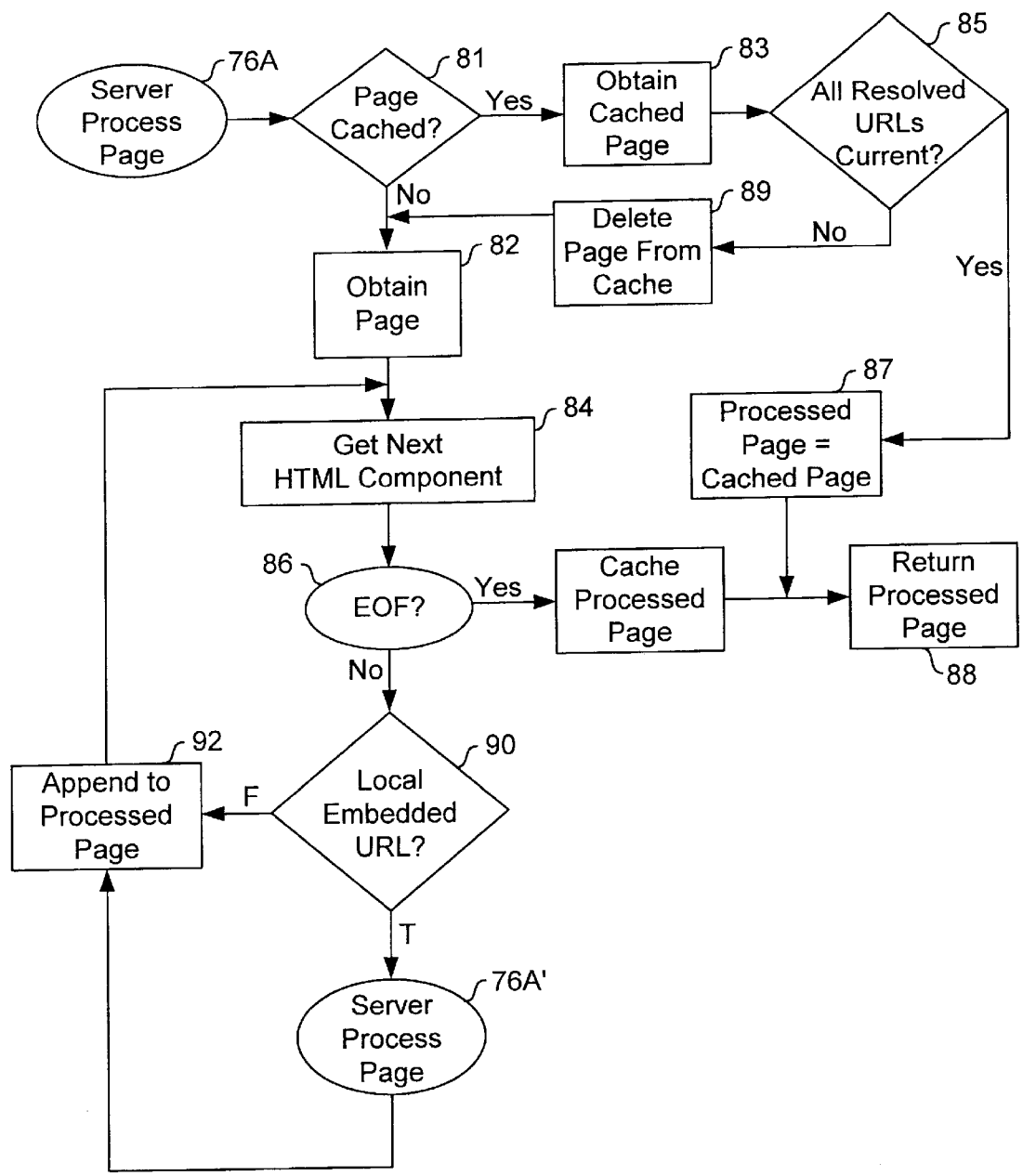
FIG. 6*a* is a flow-diagram illustrating a "Server Process Page" process of FIG. 5 in accordance with a preferred embodiment of the present invention.
Figure 6B:
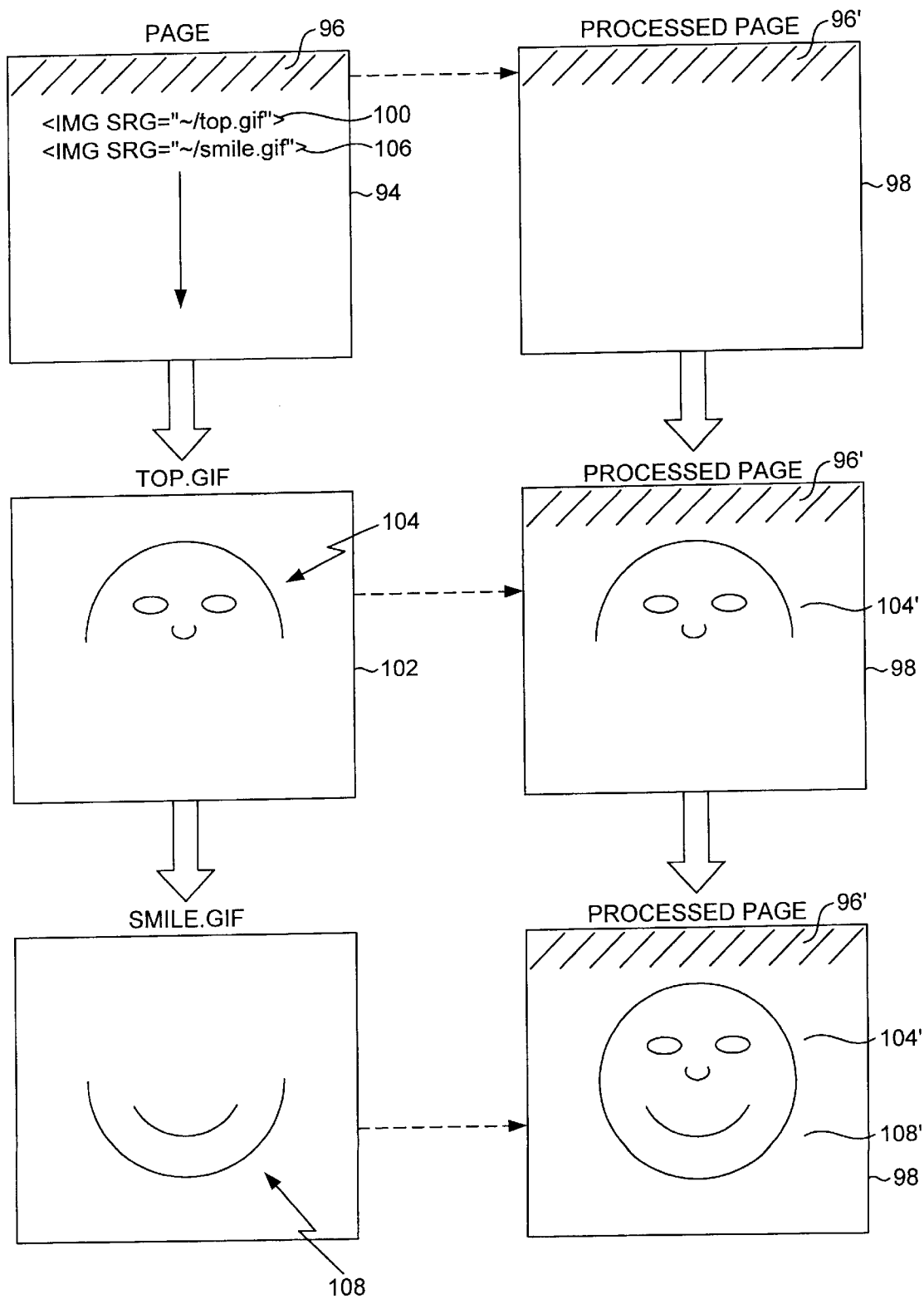
FIG. 6*b* pictorially illustrates the process of FIG. 6*a;*

FIG. 6b illustrates the operation of the processes of FIGS. 5 and 6a. With additional reference to those figures, assume that a client machine has made connection with the server of a host machine and has provided the URL "PAGE." Assume that the page is not cached. Such a web page is illustrated in FIG. 6b at page 94. The Server Process Page process 76 of FIG. 6a is then evoked. The page 94 is obtained in step 82 and the next HTML component is retrieved in step 84. In this illustration, assume that the hatched area 96 includes HTML components that do not include a local embedded URL and which are not an eof. Therefore, the process 76 will loop through steps 84–92 to append the HTML components of hatched area 96 to a Process Page 98 as indicated at page 96'.

This continues until a local embedded URL such as local embedded URL 100 is detected by step 90. In this instance, the local embedded URL is <IMG SRC="~\top.gif">. Upon the detection of a local embedded URL, a recursive call 76A' is made to the Server Process Page 76. This recursive call will obtain the page "top.gif" in a step 82, which is a graphical file in the well known GIF format.

Assume that the top.gif page is represented as illustrated at 102 in FIG. 6b. Therefore, the top.gif page 102 includes data 104 representing the top portion of a head. The data 104 is copied over to the Processed Page as indicated at 104' by the loop 84–92.

When step 90 of FIG. 6a detects the local embedded URL 106 of <IMG SRC="~\smile.gif">., a second recursive call 76A' is made to the Server Process Page process 76. This causes the process 76 to obtain the page "smile.gif" in step 82 which is comprised of data 108, which is copied over to the process page 98 as illustrated at 108' by loop 84–92.

In consequence, the processes of FIGS. 5 and 6a produce a Processed Page 98 from an original page 94. The Processed Page does not include local embedded URLs which would cause time consuming re-connections to the host machine. Therefore, a browser reading the Processed Page 98 will not have to make re-connections connections to the host machine server in order to view the images. In this example, two connections to the host machine server can be avoided, namely the first connection caused by the embedded URL 100 and a second connection caused by the embedded URL 106. This is because the previously embedded URLs have been replaced with the images that they represent.

While this embodiment has been described in terms of multiple embedded URLs to illustrate the potentially recursive nature of the process, it will be appreciated that this process works equally well for embedded URLs that are not recursive in nature. For example, the "smiling face," of the previous example could of been provided as a single image "smilingface.gif." In that instance, the single URL connection required for obtaining the GIF file could have been avoided by the web page pre-processing of the present invention. Of course, the more embedded URLs there are, and the more recursively embedded URLs there are, the greater the savings with the process of the present invention.

The foregoing assumes, however, that a significant number of the embedded URLs did not point to web pages already stored in the cache memory of the client machine. If there were a considerable number of pre-cached pages, the performance of the system could conceivably be degraded since information would be sent over the Internet from the host machine to the client machine that was already present in the cache memory of the client machine. However, under common circumstances it can be shown that most embedded URLs in a typical web browsing session are encountered once and once only, such that the Server Process Page 76a process will provide a network browsing experience that is substantially superior to a conventional web browsing experience of the prior art.

Figure 7A:
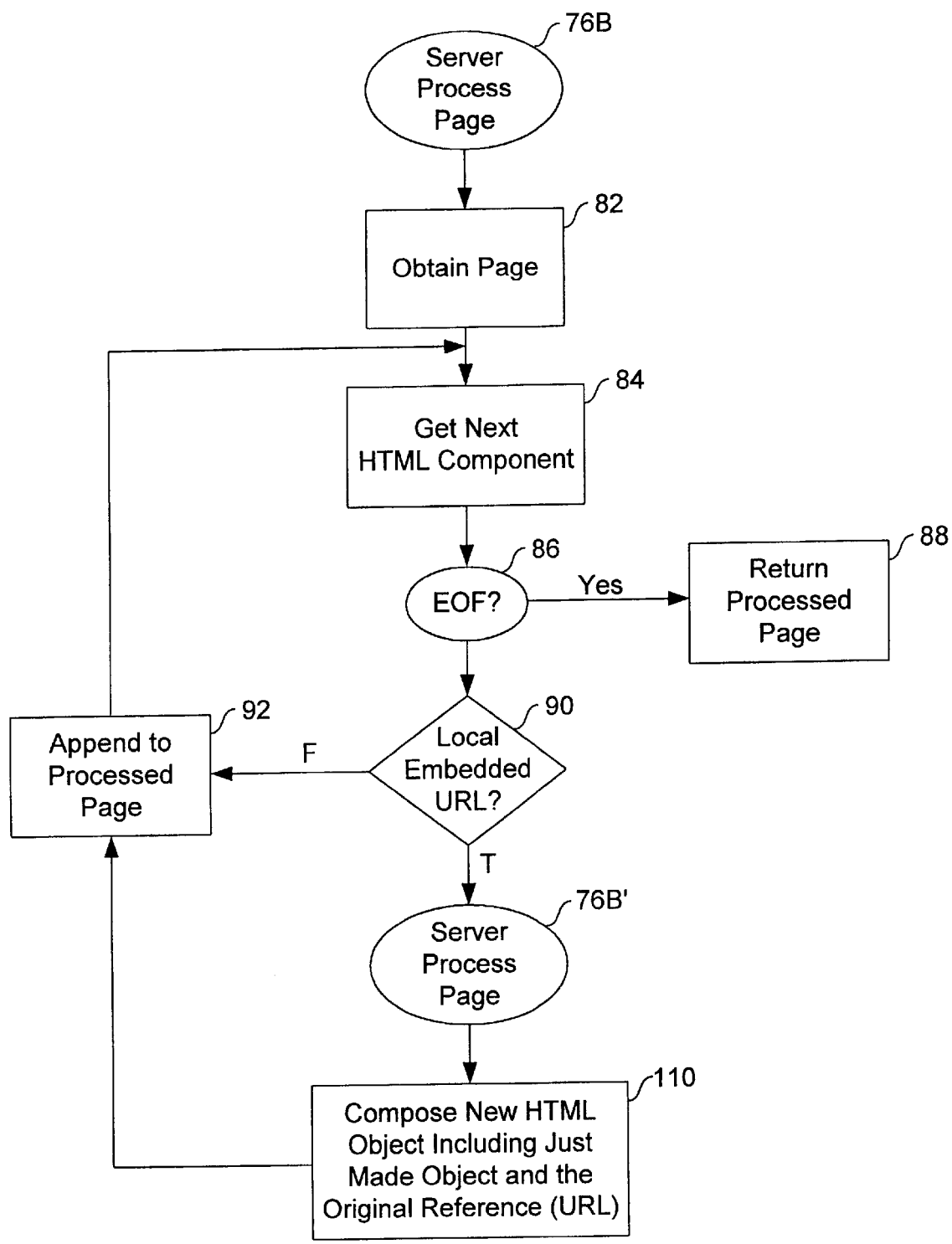
FIG. 7*a* illustrates another preferred embodiment of the "Server Process Page" process of FIG. 5.

In FIG. 7a, an alternative preferred embodiment of the present invention for a Server Process Page process 76 is illustrated in flow diagram form. The process 76b, like the process 76a of FIG. 6a, obtains a page in a step 82, retrieves the next HTML component in a step 84, checks for end of file in a step 86, returns a Processed Page 88 if the end of file is found, checks for an embedded URL in a step 90, and appends it to a Process Page 92. Process control is then returned to step 84 to obtain the next HTML component. It should therefore be apparent that the steps 82–92 are essentially the same as the steps with like reference numerals of process 76a. However, if step 90 determines that a local embedded URL has been found, a recursive Server Process Page process 76b' is evoked. After the completion of the recursive call 76b', a step 110 composes a new HTML object including the "just made" object by the process 76b' and the original reference (URL). The "just made" object is the object made by the URL after all recursive calls have been resolved to that level. This new HTML "object" will allow a modified web browser of the present invention to use both caching and minimal re-connections to the host machine to greatly optimize system performance.

Figure 7B:
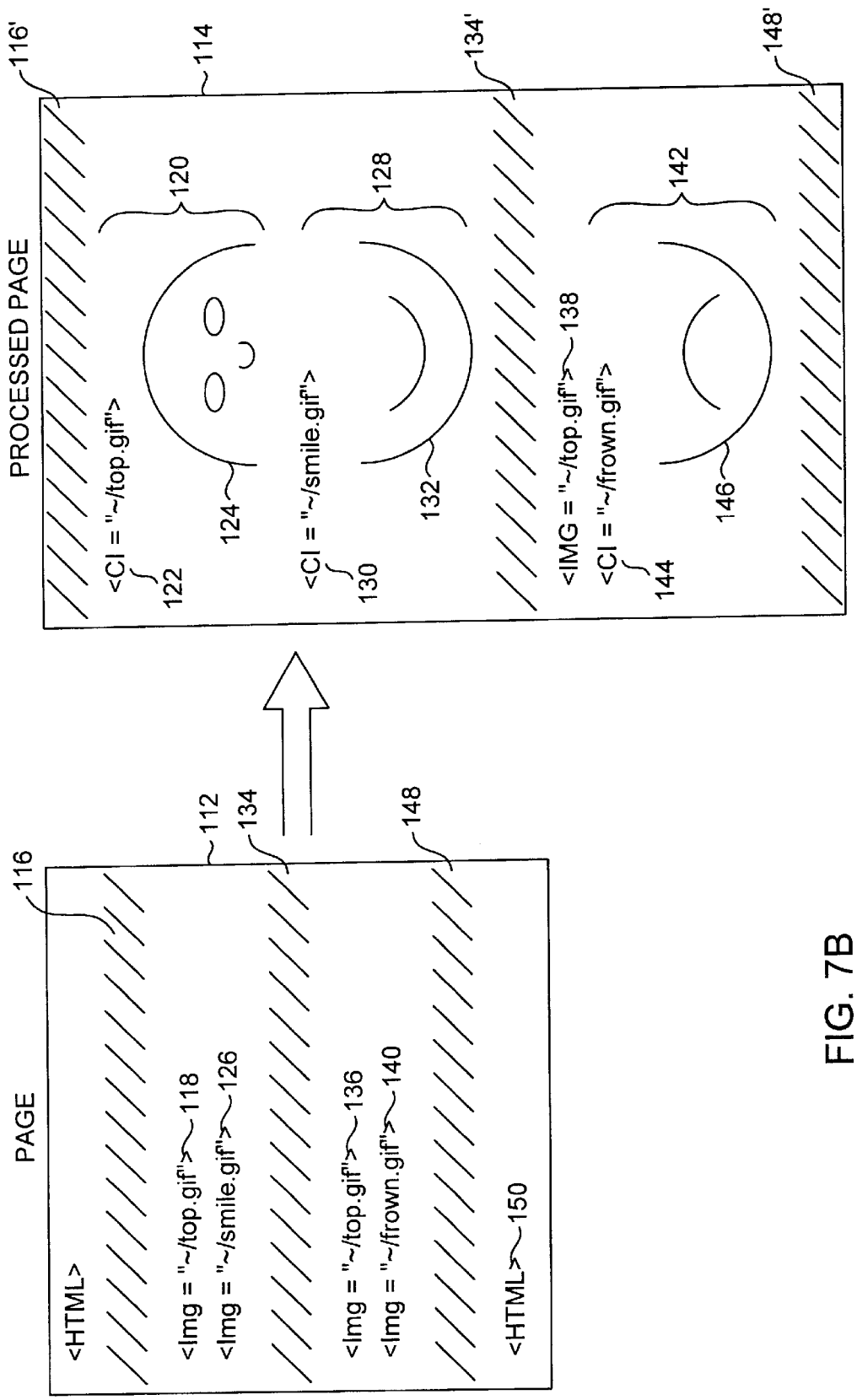
FIG. 7*b* pictorially illustrates the process of FIG. 7*a;*

The processes of FIG. 5 and FIG. 7a are further illustrated in a form of an example in FIG. 7b. In this example, assume that an original page 112 has been processed by the aforementioned processes 72 and 76b to create the Processed Page 114. The page 112 has miscellaneous HTML components 116 which are copied over to the Processed Page 114 as illustrated at 116' by the steps 84–92 of FIG. 7a. When a first embedded URL 118 is detected in the page 112 by step 90 of FIG. 7a, the Server Process Page process 76b' is recursively called. In this instance, we are assuming that top.gif does not include a recursive reference to smile.gif, as it did in the previous example. Therefore, a new HTML object 120 is created including a "cache image" or "CI" command 122 and the data 124. This object 120 is appended to the Processed Page in step 92. When the embedded URL 126 is encountered, the process 76b of FIG. 7a produces an object 128 including a CI command 130 and data 132. A series of additional HTML components 134 can then be encountered which are copied over to 134' by the loop of steps 84–92 of FIG. 7a until step 90 of FIG. 7a detects the local embedded URL 136. However, since the data 124 for top.gif has already been cached by the command CI 122 in object 120, an image or "IMG" command 138 can be used to retrieve the data 124 from the cache memory of the client machine. In this instance, therefore, the data 124 for the top of the head does not have to be re-transmitted from the host machine to the client machine, since it is already present in the cache of the client machine. 25 When the local embedded URL 140 is encountered, the Server Process Page process 76b' and step 110 produce an object 142 including a CI command 144 and data 146. The other HTML components 148 are then copied over to 148' of process page 114 by the loop 84–92 of FIG. 7a. The process continues until the end of file 150 is completed at which time the process page is returned in step 88 of FIG. 7a.

It should be noted that the process 76b of FIG. 7a creates a new type of command, namely a "cache image" or "CI" command. Examples of these commands are found at 122, 130, and 144 in FIG. 7b. However, conventional web browsers will not be able to interpret these new commands, which may result in an inaccurate image of the web page being displayed on the screen of the client machine.

Figure 8:
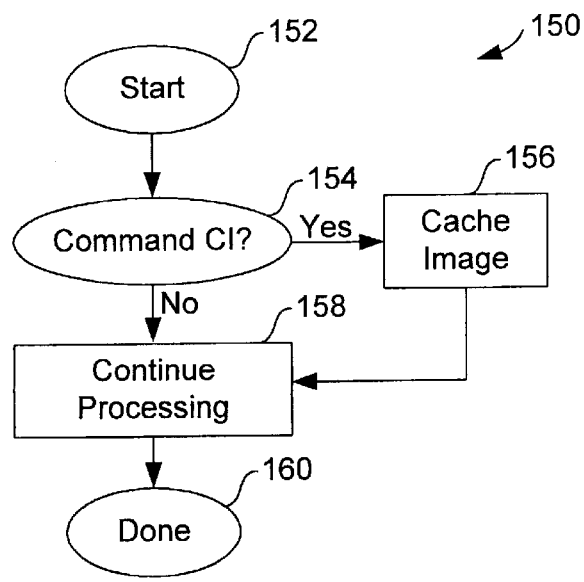
FIG. 8 is a flow-diagram illustrating the process of an improved web browser running on a client machine in accordance with the present invention.

In FIG. 8, a web browser process 150 in accordance with the present invention is designed to interpret the CI commands. The process 150 is essentially a HTML parsing and interpreting routine within a web browser, as will be appreciated by those skilled in the art. The process 150 begins at 152 and, in a step 154, it is determined whether there is a command CI. If so, a step 156 caches the image, i.e. the data, following the CI command. The web browser then continues processing as indicated in step 158 and the process is completed at 160. It will therefore be appreciated that the processing of the CI command comprises a rather small modification to existing browser technology. To implement the modification, additional code can be embedded within the source code of a web browser, such as within the source code of the public domain version of the Mosaic web browser available from NCSC. Alternatively, a "plug-in" or "extension" to an existing commercial web browser, such as a Netscape Navigator web browser, can be used to provide the indicated functionality.

With the combined processes of FIGS. 5 and 7a, the combined advantage of minimizing connections combined with the local caching of images is realized. This is accomplished by forcing a caching of images the first time they are received, and by only providing image commands to the web browser when those images are already in the cache of the client machine running the web browser. In consequence, this embodiment of the present invention reduces the amount of data that is to be transmitted, and requires only a single connection between the client browser on the client machine and the server on the host machine in order to display a web page.

It should be noted that, under some circumstances, the process of this embodiment (i.e. the process of FIGS. 5 and 7a) might send data to be cached that has already been cached on the client machine's hard disk and might request a page that has already been cached on a client machine to be cached again. This could happen when a URL of an already cached page is embedded in a newly requested page. For example, and with reference to FIG. 6b, it is possible that a client machine may have cached "smile.gif", "top.gif", or both, even though it had not cached "PAGE." As a result, redundant data might be sent from the host machine to the client machine, and a redundant cache operation might be performed on the client machine.

Figure 9:
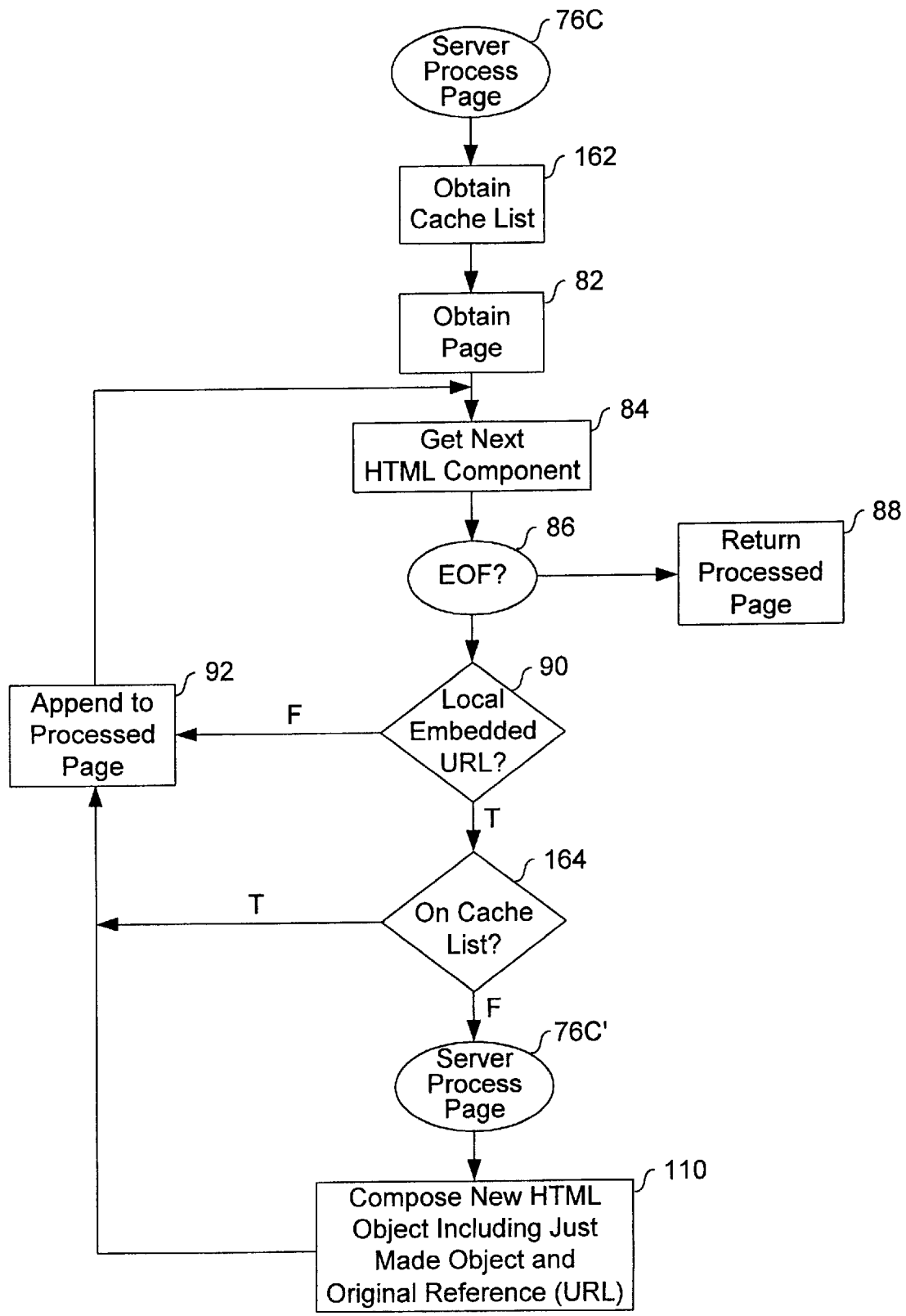
FIG. 9 illustrates yet another preferred embodiment of the "Server Process Page" process of FIG. 5.

To address this problem, another preferred embodiment of the present invention determines whether an embedded URL is already present in the cache of the client machine. With reference to FIG. 9, a Server Process Page process 76c obtains a cache list in a step 162 from the client machine prior to processing the requested page. This cache list can be obtained by several methods. In a first method, the server software sends a request to view the cache on the client machine's hard disk and retrieves information (preferably in the form of a list to minimize the number of required connections) concerning which web pages have already been cached on the client machine. Alternatively, a modified web browser on the client machine can provide this information at the time of the connect request and URL. Again, the web browser of the present invention can be modified from a currently available web browser or can be modified by using web browser plug-ins.

Steps 82–92 of FIG. 9 operate as previously described with reference to FIGS. 6a and 7a to append non-URL commands and data to the Processed Page. However, if step 90 detects a local embedded URL, a step 164 determines whether it is on the cache list for the client machine. If so, the URL is appended to the Processed Page in a step 92. When the client machine sees this URL, it will retrieve the page from its cache memory. If step 90 does not find the URL on the cache list, process 76C is recursively evoked as indicated at 76C'. After the completion of the recursive process 76', step 110 is performed as described previously to compose a new HTML object, which is appended to the Processed Page in the previously described step 92.

It will therefore be appreciated that a network browsing system of the present invention includes a network having a plurality of nodes and a host computer, the host computer and the plurality of nodes being interconnected for the transmission of data. The client computer includes a display and is also connected to the network for the transmission of data. A network browser process implemented on the client computer is capable of establishing a connection with the host computer and of generating a request for desired data from the host computer which is to generate desired images on the display of the client computer. A server process implemented on the host computer services the request for desired data received from the client computer by modifying the desired data into modified data such that no additional connection between the client computer and the host computer is required to receive the entirety of the modified data. The browser process can generate the desired images from the modified data to the same extent as it could have from the originally requested data. The server process is further being operative to transmit the modified data to the client machine, and to disconnect from the client computer after the transmission of the modified data. Preferably, the network transmits data using a TCP/IP protocol, and the transmission of data includes the transmission of HTML data.

It will also be appreciated that the present invention includes a process implemented on a host computer coupled to a computer network including establishing a connection with a client computer over the network, receiving a request from the client computer for desired data that is to be provided by the host computer and modifying the desired data into modified data such that no additional connection between the client computer and the host computer is required to receive the entirety of the modified data. The modified data preferably includes image information of the desired data. The process also includes transmitting the modified data to the client machine and disconnecting from the client computer after the transmission of the modified data. Preferably, the network transmits data using a TCP/IP protocol, and the desired data includes HTML data.

In addition, a process of the present invention as implemented on a client computer coupled to a computer network includes initiating a connection with a host computer of said computer network, requesting desired data from said host computer, and analyzing received data from said host computer for a cache image command. If such a command is detected the process caches image information obtained from said received data on a local storage medium. Preferably, the process further provides said host computer with information concerning the contents of said cache on said local storage medium.

While this invention has been described in terms of several preferred embodiments, there are alterations, permutations, and equivalents which fall within the scope of this invention. It should also be noted that there are may alternative ways of implementing both the process and apparatus of the present invention. However, such modifications will become readily apparent to those skilled in the art after studying preceding descriptions and studying the drawings. It is therefore intended that the following appended claims includes all such alterations, permutations, and equivalents that fall within the true spirit and scope of the present invention.

What is claimed is:

1. A network browsing system comprising:

a network including a plurality of nodes and a host computers, said host computer and said plurality of nodes being interconnected for the transmission of data;

a client computer including a display, said client computer being connected to said network for the transmission of data;

a network browser process implemented on said client computer that is capable of establishing a connection with said host computer and of generating a request for desired data from said host computer which is to generate desired images on said display of said client computer; and a server process implemented on said host computer which services said request for desired data received from said client computer by modifying the desired data into modified data such that no additional connection between the client computer and the host computer is required to receive the entirety of the modified data, where said browser process can generate said desired images from said modified data, said server process further being operative to transmit the modified data to the client machine, and disconnecting from the client computer after the transmission of the modified data;

wherein said server process determines whether said requested data includes a local embedded URL and, if so, obtains the data associated with said local embedded URL and includes such data with said modified data.

2. A network browsing system as recited in claim 1 wherein said network transmits data using a TCP/IP protocol, and wherein said transmission of data includes the transmission of HTML data.

3. A network browsing system as recited in claim 2 wherein said server process determines whether the requested data includes a local embedded URL and, if so, composes HTML data including an data associated with said local embedded URL and with said URL itself.

4. A network browsing system as recited in claim 3 wherein said server process is recursive.

5. A network browsing system as recited in claim 2 wherein said network browser process processes a cache image command within said modified data to cache an image in a local storage of said client computer.

6. A network browsing system as recited in claim 5 wherein said client computer is configured to provide said host computer with information concerning cached images such that said modified data does not need to include images that are already cached on said client computer.

7. A network browsing system as recited in claim 1 wherein determining whether the requested data includes a local embedded URL is a recursive process.

8. A process implemented on a host computer coupled to a computer network comprising:

establishing a connection with a client computer over said network;

receiving a request from said client computer for desired data that is to be provided by said host computer;

modifying said desired data into modified data such that no additional connection between the client computer and the host computer is required to receive the entirety of the modified data, where modified data includes image information of said desired data, wherein modifying said desired data includes analyzing said desired data for a local embedded URL, and by resolving said local embedded URL by including data referenced by said local embedded URL in said modified data;

transmitting the modified data to the client machine; and disconnecting from the client computer after the transmission of the modified data.

9. A process as recited in claim 8 wherein said network transmits data using a TCP/IP protocol, and wherein said desired data includes HTML data.

10. A process as recited in claim 8 wherein said resolving said local embedded URL is a recursive process.

11. A process as recited in claim 10 wherein said resolving said local embedded URL includes creating a new HTML object including image information said URL.

12. A process as recited in claim 11 wherein modifying said desired data further includes inserting at least one of inserting image caching and cached image retrieving commands into said modified data.

13. A process as recited in claim 8 wherein said process further comprises receiving cache information from said client computer, and wherein modifying said desired data includes omitting image information that is already cached on said client computer.

14. A computer readable medium containing program instructions implementing the process of claim 8.

* * * * *